US011491686B2

(12) United States Patent
VanDeMark et al.

(10) Patent No.: US 11,491,686 B2
(45) Date of Patent: Nov. 8, 2022

(54) COMPRESSION MOLDED CASCADES WITH TWO PIECE MOLD

(71) Applicant: THE BOEING COMPANY, Chicago, IL (US)

(72) Inventors: Zachariah VanDeMark, Snohomish, WA (US); David J. Barene, Arlington, WA (US); Everette D. Gray, Seattle, WA (US); Chen Chuck, Mercer Island, WA (US); Tunde A. Olaniyan, Bothell, WA (US); Garry A. Booker, Lake Stevens, WA (US); Douglas G. Cogswell, Kingston, WA (US); Stephen R. Dark, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 467 days.

(21) Appl. No.: 16/518,275

(22) Filed: Jul. 22, 2019

(65) Prior Publication Data

US 2021/0023745 A1 Jan. 28, 2021

(51) Int. Cl.
*B29C 43/02* (2006.01)
*B29C 43/14* (2006.01)
(Continued)

(52) U.S. Cl.
CPC .......... *B29C 43/146* (2013.01); *B29C 33/485* (2013.01); *B64F 5/10* (2017.01); *F02K 1/56* (2013.01); *B29C 2043/023* (2013.01)

(58) Field of Classification Search
CPC .... B29C 2043/023; B29C 33/485; F02K 1/58
See application file for complete search history.

(56) References Cited

U.S. PATENT DOCUMENTS 2,345,200 A 3/1944 Iknayan
3,024,604 A 3/1962 Morley
(Continued)

FOREIGN PATENT DOCUMENTS

CN 88103525 A 12/1988
CN 102741045 A 10/2012
(Continued)

OTHER PUBLICATIONS

Extended European Search Report for EP Application No. 18152219.4 dated Jul. 17, 2018.
(Continued)

*Primary Examiner* — Timothy Kennedy
*Assistant Examiner* — Alexander A Wang
(74) *Attorney, Agent, or Firm* — Marshall, Gerstein & Borun LLP

(57) ABSTRACT

Compression mold assembly for forming a preform of a cascade includes first and second die elements and an axis of alignment. Line of removal of a formed preform is positioned perpendicular to a plane perpendicular to the axis of alignment. First die portion includes first curved surface forming interior surface of first strong back and second die portion includes first curved surface forming interior surface of a second strong back of a cell of a formed preform. Second die portion includes second curved surface forming an interior surface of a first vane on forward side of the cell of the formed preform and first die portion further includes first wall member which extends along line of removal and a second wall member which extends angularly from first wall portion forming an interior surface of a second vane positioned on an aft side of the cell.

20 Claims, 17 Drawing Sheets

(51) Int. Cl.
*F02K 1/56* (2006.01)
*B64F 5/10* (2017.01)
*B29C 33/48* (2006.01)

(56) References Cited

U.S. PATENT DOCUMENTS

| | | |
|---|---|---|
| 3,076,309 A | 2/1963 | Brown et al. |
| 3,795,559 A | 3/1974 | Horn et al. |
| 4,165,609 A | 8/1979 | Rudolph |
| 4,183,478 A | 1/1980 | Rudolph |
| 4,722,821 A | 2/1988 | Vermilye |
| 4,778,110 A | 10/1988 | Sankey et al. |
| 4,852,805 A | 8/1989 | Vermilye |
| 4,892,462 A | 1/1990 | Barbier et al. |
| 5,128,192 A | 7/1992 | Narasaki |
| 5,152,860 A | 10/1992 | Grossman et al. |
| 5,348,601 A | 9/1994 | Ray |
| 5,399,395 A | 3/1995 | Forman et al. |
| 5,576,079 A | 11/1996 | Forman et al. |
| 5,624,618 A | 4/1997 | Forman et al. |
| 5,789,060 A | 8/1998 | Marshall et al. |
| 6,557,338 B2 | 5/2003 | Holme et al. |
| 6,558,608 B2 | 5/2003 | Haraldsson et al. |
| 6,830,718 B2 | 12/2004 | Maumus et al. |
| 7,007,454 B2 | 3/2006 | Dehu et al. |
| 7,998,299 B2 | 8/2011 | McCarville et al. |
| 8,333,858 B2 | 12/2012 | Rubin et al. |
| 8,484,944 B2 | 7/2013 | Urban et al. |
| 8,583,271 B2 | 11/2013 | Engelbart et al. |
| 8,608,890 B2 | 12/2013 | Everhart et al. |
| 9,086,034 B2 | 7/2015 | Aten et al. |
| 9,102,103 B2 | 8/2015 | Fox et al. |
| 9,120,246 B2 | 9/2015 | Oldroyd et al. |
| 9,145,277 B2 | 9/2015 | Kendrick et al. |
| 9,211,618 B2 | 12/2015 | Hethcock et al. |
| 9,314,941 B2 | 4/2016 | Wallen et al. |
| 9,587,582 B1 | 3/2017 | Schaefer et al. |
| 9,895,840 B2 | 2/2018 | Bartel et al. |
| 2001/0001409 A1 | 5/2001 | Weight et al. |
| 2012/0021165 A1 | 1/2012 | Hethcock et al. |
| 2012/0036716 A1 | 2/2012 | Urban et al. |
| 2012/0119417 A1 | 5/2012 | Everhart et al. |
| 2012/0189798 A1 | 7/2012 | Goering et al. |
| 2012/0228467 A1 | 9/2012 | Wallen et al. |
| 2012/0251647 A1* | 10/2012 | Aylmore ............ B29C 43/203 425/149 |
| 2013/0092755 A1 | 4/2013 | Aten et al. |
| 2016/0263820 A1 | 9/2016 | Kruckenberg |

FOREIGN PATENT DOCUMENTS

| | | |
|---|---|---|
| EP | 0219889 A2 | 4/1987 |
| EP | 2518593 A1 | 10/2012 |
| EP | 2944452 A2 | 11/2015 |

OTHER PUBLICATIONS

State Intellectual Property of China Second Notification of Office Action, dated Jul. 18, 2017, regarding Appln No. 201510249918.4, 16 pages.
State Intellectual Property of China First Notification of Office Action, dated May 15, 2014, regarding Appln No. 201510249918.4, 18 pages.
Canadian Intellectual Property Office Examination Report, dated Jan. 31, 2017, regarding Appln No. 2,884,995, 3 pages.
Extended European Search Report for EP Application No. 15167817.4 dated Feb. 4, 2016, 11 pages.
Canadian Intellectual Property Office Examination Report, dated Mar. 24, 2016, regarding Appln No. 2,884,995, 3 pages.
Application filed for U.S. Appl. No. 16/003,842, 76 pages.
Application filed for U.S. Appl. No. 15/837,604, 49 pages.
Application filed for U.S. Appl. No. 16/139,449, 36 pages.

* cited by examiner

COMPRESSION MOLDED CASCADES WITH TWO PIECE MOLD

FIELD

This disclosure relates to fabrication of a cascade for a thrust reverser and more particularly to an assembly and method for manufacturing the cascade.

BACKGROUND

Thrust reversers are assemblies which are used to redirect jet engine exhaust in a landing maneuver of an aircraft. A blocker door of the thrust reverser assembly changes the direction of jet engine exhaust from exiting the jet engine in a direction toward an aft portion of the aircraft and directs exhaust to and through cascades positioned about a nacelle which surrounds the jet engine. The configuration of surfaces in the cascade direct the jet engine exhaust in desired directions such as toward a forward portion of the aircraft so as to slow the speed of the aircraft once the aircraft has landed. Other cascade surfaces can redirect the jet engine exhaust in desired directions away from the aircraft to avoid imparting wear and/or damage to the aircraft from the jet engine exhaust.

Vane structures of cascades will generally direct jet engine exhaust flow in a direction toward the forward portion of the aircraft to assist in slowing down the speed of the aircraft upon landing. Strong back structures of cascades generally direct the jet engine exhaust in a side turning direction and away from surfaces of the aircraft. As a result, cascades include complex shapes which provide surfaces of the vanes and the surfaces of the strong backs to direct the jet engine exhaust in desired directions when the thrust reverser assembly is employed.

Constructing surfaces of the vanes and the strong backs within the cascade results in incurring considerable labor, cost, as well as, turnaround time for production. A number of cascades are typically positioned about the perimeter of the nacelle and each cascade can have surface configurations that can differ from other cascades positioned about the same nacelle so as to accomplish the desired directing of the jet engine exhaust at the time of landing.

Cascades have been made conventionally with composite material by way of hand layups. This fabrication methodology is labor intensive and results in high production cost. Other methods of fabrication of cascades has included compression mold thermoplastic manufacturing processes which is less labor intensive. However, cascade configurations include arrays of complex four sided cells which are constructed of one set of opposing sides being vane structures and a second set of opposing sides being strong back structures. Mold designs to accommodate thrust reverser cascade configurations typically have to accommodate under-cut geometries which does not allow for simple extraction of mold tool elements. The existing solution uses multiple insert pieces for each cascade vane passageway or cell. The number of tool parts for a single cascade includes numerous tool insert parts for fabrication of a single thrust reverser cascade. This tooling creates an unacceptable level of labor related to tool inventory, set up, cleaning, and quality assurance of each tooling element.

As a result, there is a need to simplify the compression molding assembly of a thrust reverser cascade. A compression mold assembly is needed that does not require a large number of tool components and still provides production of the thrust reverser cascade that can contain under-cut geometries and avoid the extensive labor cost related to tool inventory, set up, cleaning, and quality assurance of each tooling element.

SUMMARY

An example includes a compression mold assembly for forming a preform of a cascade for a thrust reverser assembly, which includes a first die element positioned at an internal side of the preform of the cascade to be formed and a second die element positioned at an external side of the preform of the cascade to be formed. The first and the second die elements define an axis of alignment such that a line of removal of a formed preform of the cascade to the first die and second die elements is positioned perpendicular to a plane which extends perpendicular to the axis of alignment. A first die portion, which extends from the first die element, includes a first curved surface which forms an interior surface of a first strong back within a cell of the preform of the cascade to be formed by the compression mold assembly. A second die portion, which extends from the second die element, includes a first curved surface which forms an interior surface of a second strong back within the cell of the preform of the cascade to be formed by the compression mold assembly. The second die portion includes a second curved surface which forms an interior surface of a first vane positioned on a forward side of the cell of the preform of the cascade to be formed by the compression mold assembly. The first die portion further comprises a wall assembly which includes a first wall member, which extends along the line of removal and a second wall member which extends in an angular direction relative to the first wall portion wherein the first wall member and the second wall member form an interior surface of a second vane positioned on an aft side of the cell of the preform of the cascade to be formed by the compression mold assembly.

Another example includes a method for fabricating a cascade for a thrust reverser, including the step of positioning a first die element at an internal side of the preform of the cascade to be formed and a second die element is positioned at an external side of the preform of the cascade to be formed. The first and the second die elements define an axis of alignment such that a line of removal of a formed preform of the cascade relative to the first die and second die elements is positioned perpendicular to a plane which extends perpendicular to the axis of alignment. A first die portion, which extends from the first die element, includes a first curved surface which forms an interior surface of a first strong back within a cell of the preform of the cascade to be formed by the compression mold assembly. A second die portion, which extends from the second die element, includes a first curved surface which forms an interior surface of a second strong back within the cell of the preform of the cascade to be formed by the compression mold assembly. The second die portion includes a second curved surface which forms an interior surface of a first vane positioned on a forward side of the cell of the preform of the cascade to be formed by the compression mold assembly. The first die portion further includes a wall assembly which includes a first wall member, which extends the line of removal and a second wall member which extends in an angular direction relative to the first wall member. The first wall member and the second wall member form an interior surface of a second vane positioned on an aft side of the cell of the preform of the cascade to be formed by the compression mold assembly. The method further includes a step of placing a polymer between the first die element and the second die element and a step of applying a compression force on the first die element and the second die element.

The features, functions, and advantages that have been discussed can be achieved independently in various embodiments or may be combined in yet other embodiments further details of which can be seen with reference to the following description and drawings.

DESCRIPTION

Figure 1:
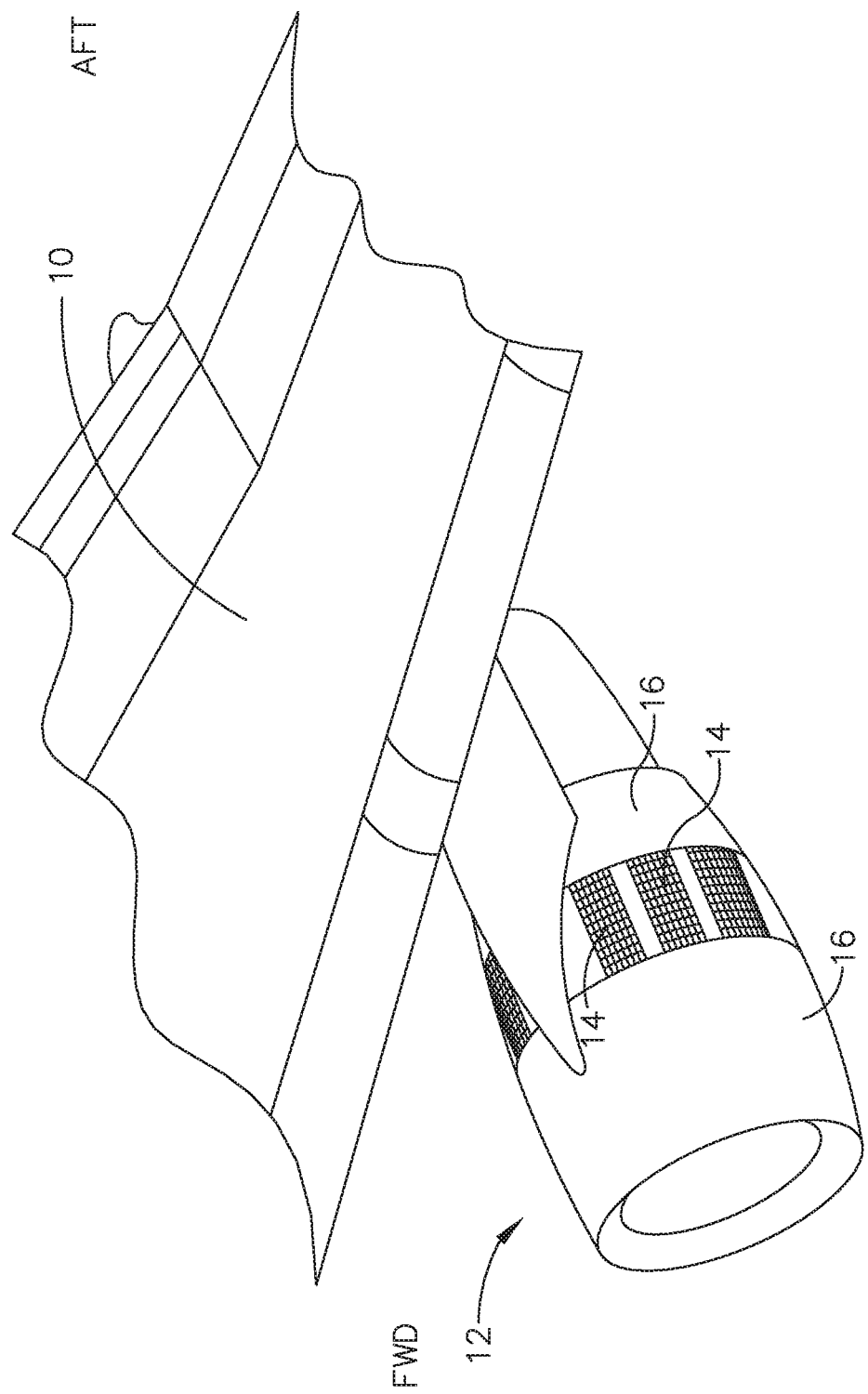
FIG. 1 is a perspective view of a jet engine positioned on a wing of an aircraft with thrust reverser cascades positioned circumferentially about a nacelle of the jet engine.

In referring to FIG. 1, wing 10 of an aircraft is shown with jet engine 12 secured to wing 10. Cascades 14 for a thrust reverser (not shown) of jet engine 12 are positioned circumferentially about nacelle 16. Thrust reverser (not shown) utilizes a blocker door of the thrust reverser assembly positioned within jet engine 12 to redirect jet engine 12 exhaust. Jet engine 12 exhaust flows toward an aft (AFT) portion of the aircraft during operational flight. However with a blocker door in operational position, jet engine 12 exhaust is redirected to and through cascades 14 positioned about nacelle 16 which surround jet engine 12.

The configuration of various surfaces within each cascade 14 direct jet engine 12 exhaust in desired directions. Vanes, which will be herein discussed, will direct jet engine 12 exhaust, that would otherwise pass through jet engine 12 toward an aft (AFT) portion of the aircraft, to a forward (FWD) direction of the aircraft so as to slow the speed of the aircraft once the aircraft has landed. Other cascade 14 surfaces, such as provided by surfaces of strong backs of cascades 14, redirect jet engine 12 exhaust other directions, such as laterally away from jet engine 12. The laterally directed exhaust is directed away from the aircraft so as to avoid the exhaust imparting wear and/or damage to the aircraft.

Figure 2:
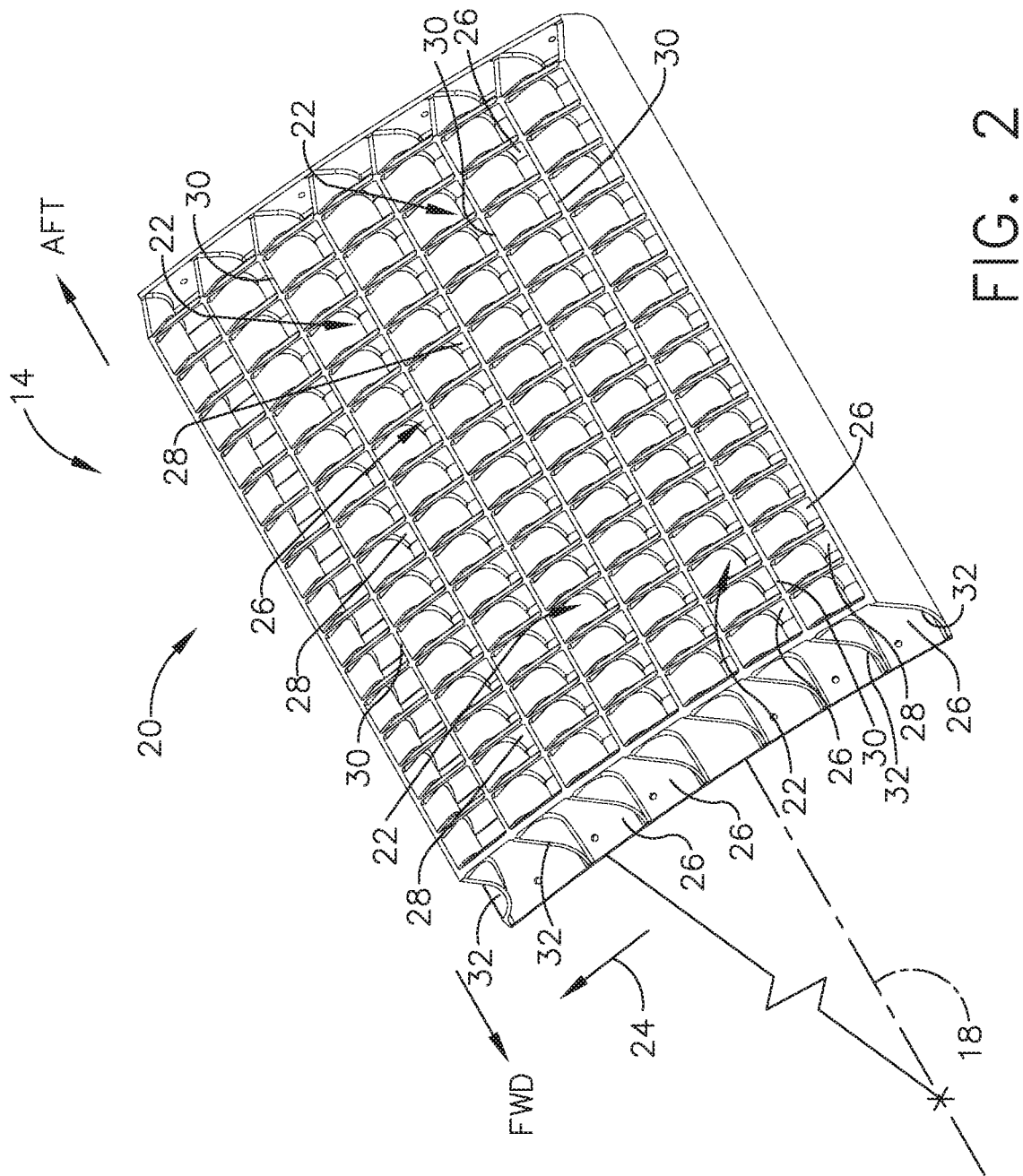
FIG. 2 is a perspective view of an external side of one of the thrust reverser cascades of the jet engine of FIG. 1.

In referring to FIG. 2, cascade 14 is shown spaced apart from centerline 18 of jet engine 12. Grid configuration 20, seen in cascade 14, include a plurality of arrays of cells 22 which align in rows. Rows of cells 22 extend in alignment with forward (FWD) and aft (AFT) directions of the aircraft and rows of cells 22 extend in direction 24 transverse to the alignment of forward (FWD) and aft (AFT) directions of the aircraft as well as extend circumferentially about nacelle 16. Vanes 26, in this example of cascade 14, have recessed surface 28 facing in the forward (FWD) direction of the aircraft to direct jet engine 12 exhaust toward forward (FWD) portion of the aircraft in reducing the speed of the aircraft on landing. Cascade 14 further includes strong backs 30 which extend along the forward (FWD) and aft (AFT) directions of the aircraft and in this example has recessed surface 32 facing laterally with respect to centerline 18 of jet engine 12. Strong backs 30 in this example direct exhaust laterally away from the aircraft.

Figure 3:
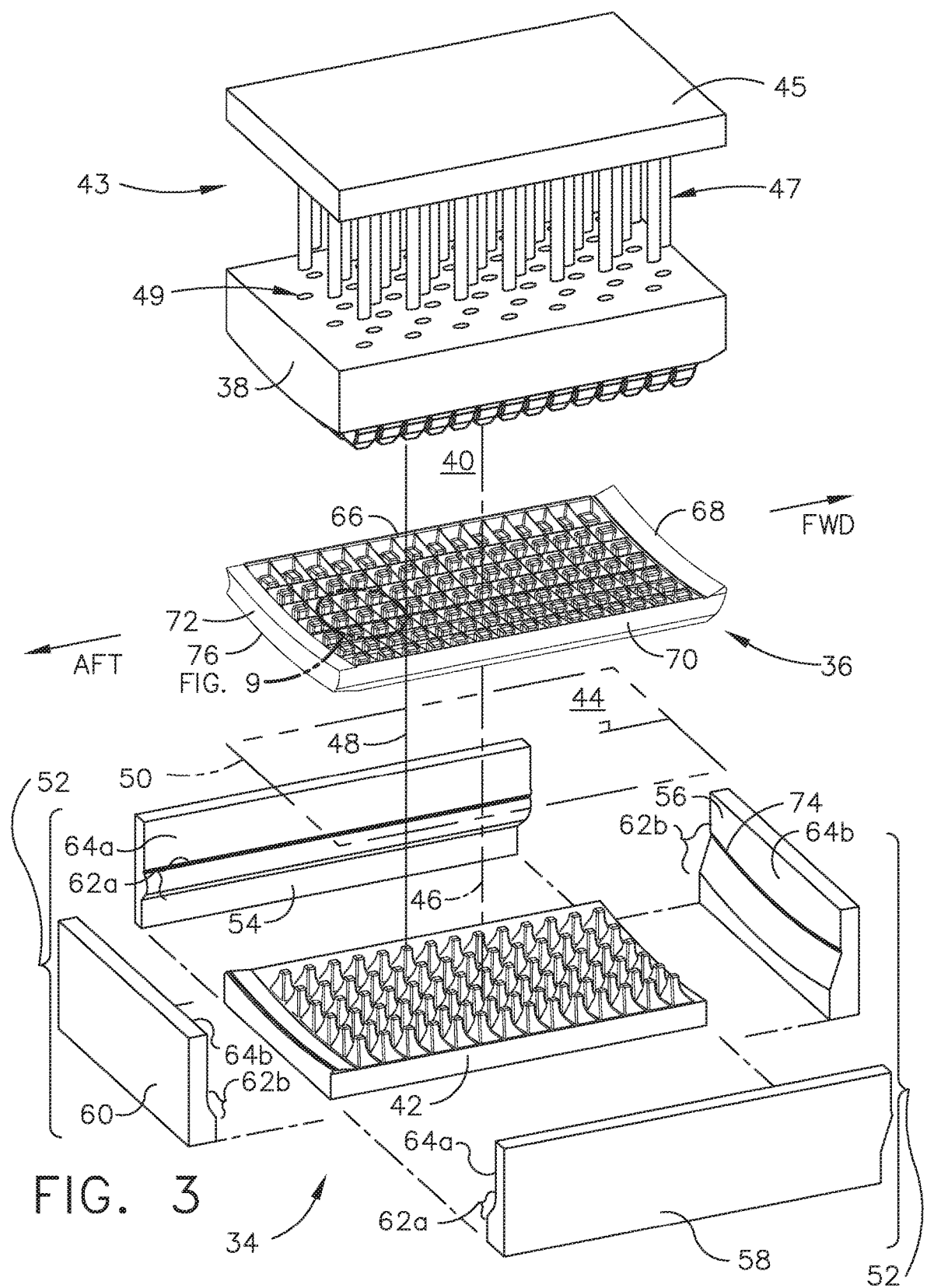
FIG. 3 is an exploded view of a compression mold assembly for compression forming a preform of a cascade of a thrust reverser cascade along with the preform.

In referring to FIG. 3, compression mold assembly 34 is shown for forming preform 36 of cascade 14 for a thrust reverser assembly (not shown). First die element 38 is positioned at internal side 40 of preform 36 of cascade 14 to be formed and second die element 42 is positioned at external side 44 of preform 36 of cascade 14 to be formed. First and second die elements 38, 42 define axis of alignment 46 such that a line of removal 48, of preform 36 of cascade 14 relative to first die and second die elements 38, 42, is positioned perpendicular relative to plane 50 which extends perpendicular to axis of alignment 46.

Compression mold assembly 34 for forming preform 36, further includes a containment assembly 52 positioned surrounding first die element 38 and second die element 42. Containment assembly 52 would also surround a polymer (not shown) positioned between first and second die elements 38, 42 and within compression mold assembly 34 for forming preform 36 of cascade 14. Containment assembly 52 includes four sidewalls 54, 56, 58 and 60 which enclose four sided first die element 38 and four sided second die element 42. Each of four sidewalls 54-60 of containment assembly 52 defines one of shape 62a and 62b on surface 64a and 64b respectively for forming a corresponding shape to each of four sides 66, 68, 70 and 72 of preform 36 of cascade 14 being formed by compression mold assembly 34.

Shape 62a positioned on surface 64a of sidewalls 54 and 58 form an external surface of opposing sides 66 and 70 of preform 36. In this example, shape 62a of each of surfaces 64a of sidewalls 54 and 58 form a shape of a strong back which extends along sides 66 and 70 of preform 36. Shape 62b positioned on surface 64b of sidewalls 56 and 60 form an external surface of opposing sides 68 and 72 of preform 36. In this example, shape 62b provides for each of surfaces 64b of sidewalls 56 and 60 to form opposing sides 68 and 72 of preform 36 so as to be planar and have a concave shape 74 facing preform 36. This configuration imparts convex shape 76 to preform 36 on external side 44 of preform 36 such that with preform 36 completed into an operational cascade 14, convex shape 76 is positioned outside of jet engine 12 and aligns with surface of nacelle 16.

In the example shown in FIG. 3 four sidewalls 54-60 of containment assembly 52 can be disassembled so as to release preform 36 from containment assembly 52 of compression mold assembly 34 once preform 36 is cured. This configuration is useful with an undercut configuration imparted into one or more of sides 66-72 of preform 36. Otherwise, if no undercut configuration is positioned on sides 66-72, the four sidewalls of containment assembly 52 can remain secured together as a unit. Once preform 36 has been cured, in this example, first die element 38 is separated from second die element 42. In this example, preform 36 moves with first die element 38. Preform 36 is then separated from first die element 38 with implementing of ejection box assembly 43. Ejection box assembly 43 includes ejector plate member 45 which carries ejection pin members 47 extending from ejector plate member 45. Ejection pin members 47 are positioned within openings 49 within first die element 38 and in this example participate in the formation of preform 36 along with first die element 38. Once preform 36 has been formed and cured, ejection pin members 47 are then urged against preform 36, so as to remove preform 36 out of engagement with first die element 38 with preform 36 remaining intact.

Figure 6:
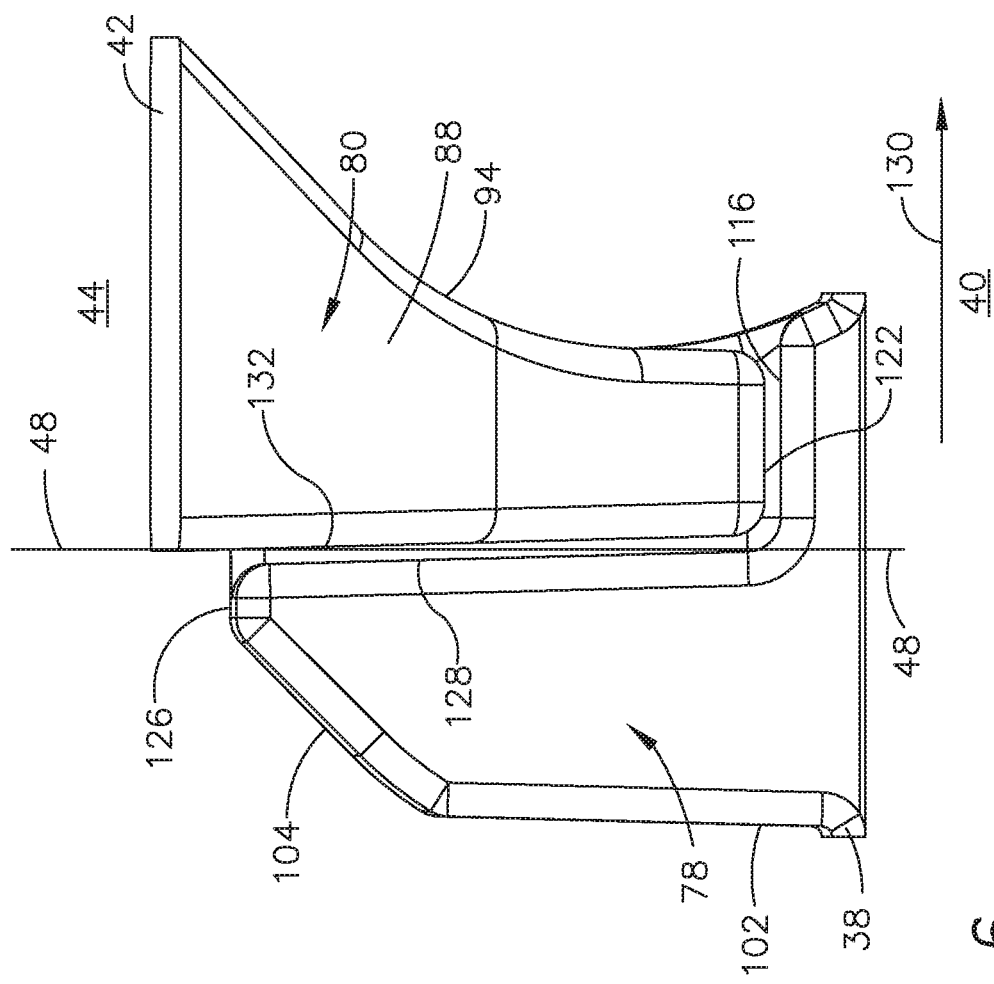
FIG. 6 is an end elevation view of FIG. 5.
Figure 7:
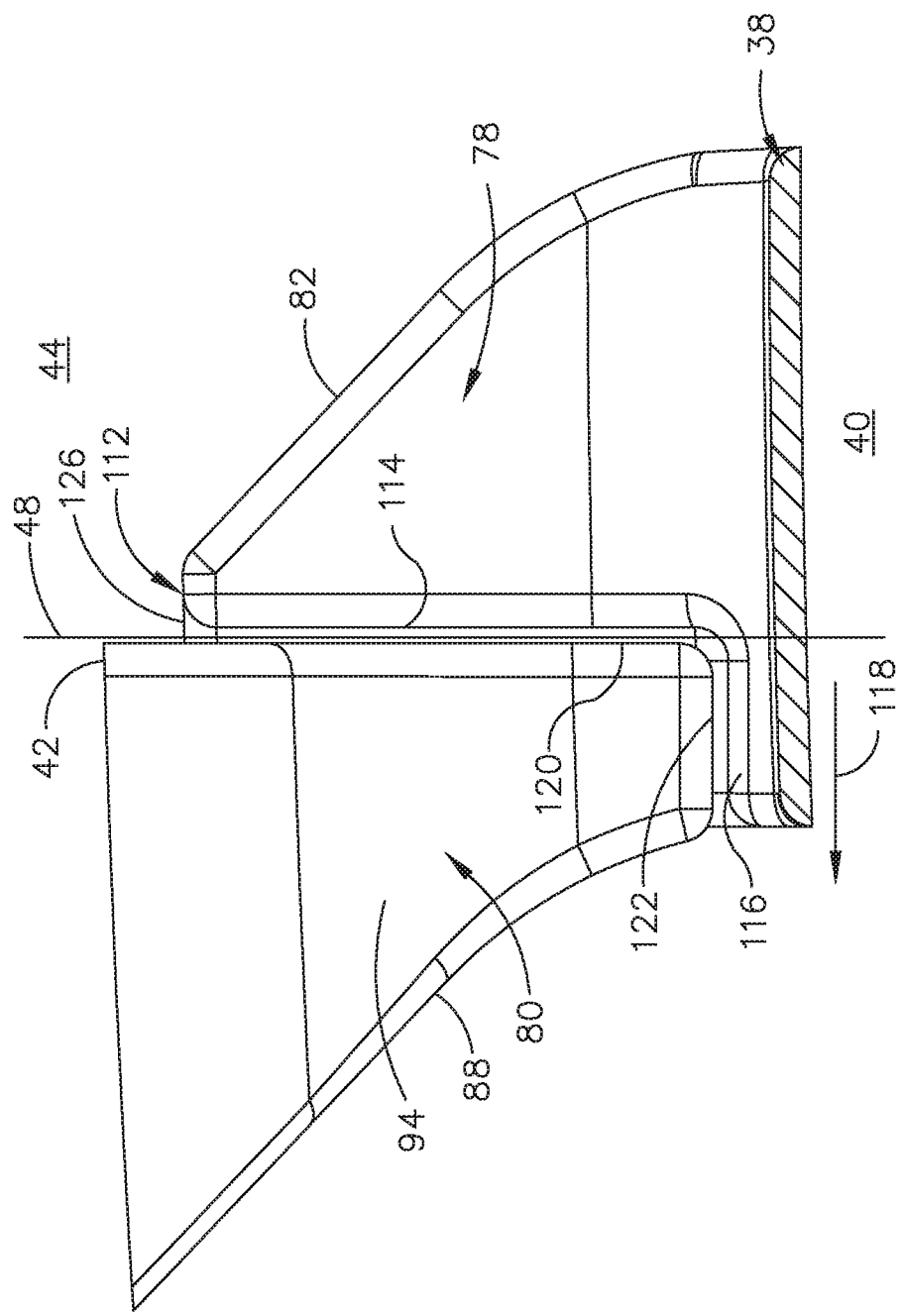
FIG. 7 is a side elevation view of FIG. 5.
Figure 8:
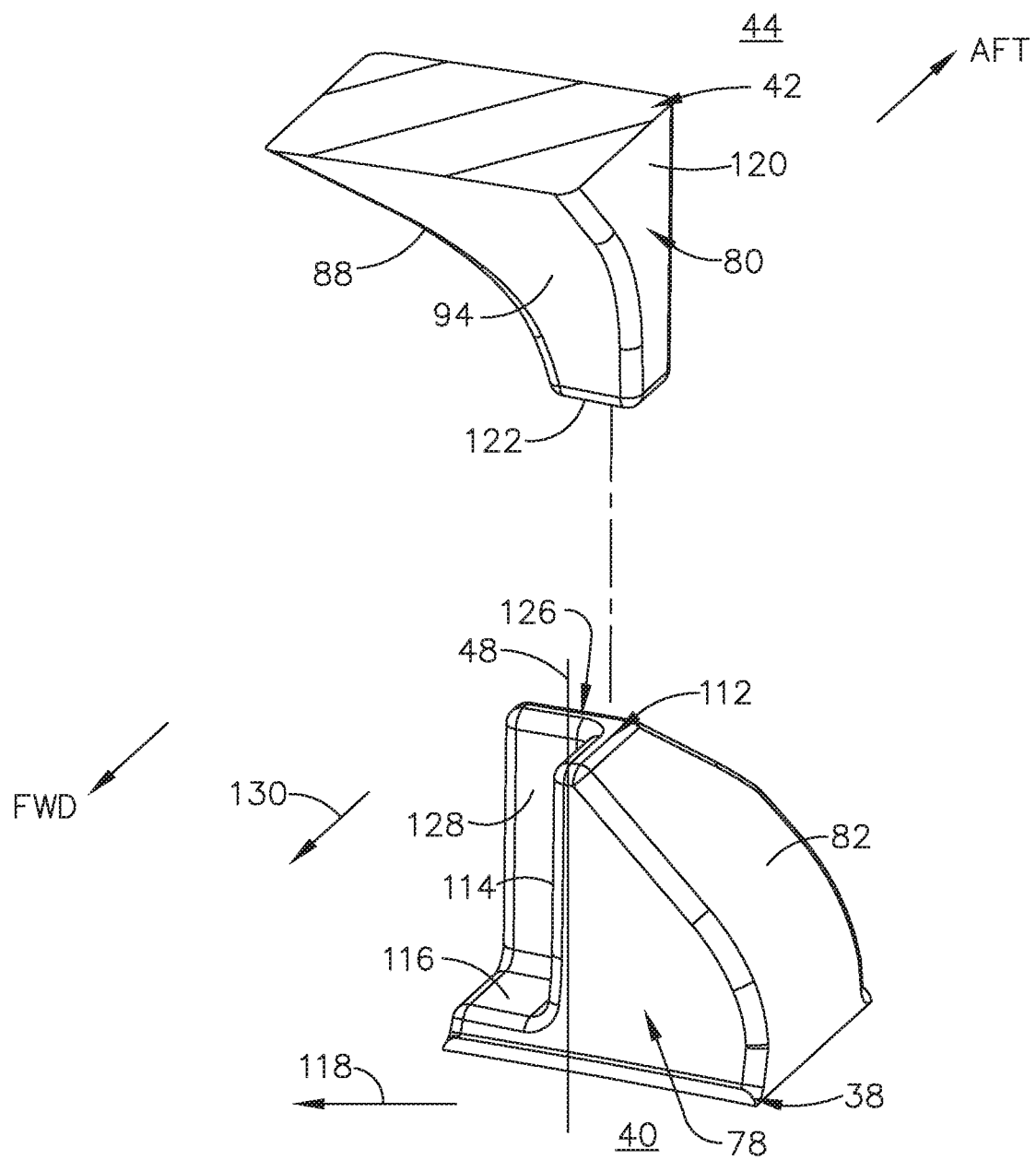
FIG. 8 is an exploded view of the first die portion and second die portion of FIG. 5.

In referring to FIGS. 4-8, first die portion 78 and second die portion 80 of compression mold assembly 34 are shown. In FIGS. 4-7 first die portion 78 and second die portion 80 are shown in operational compression position for forming preform 36 of cascade 14. In FIG. 8, first die portion 78 and second die portion 80 are shown positioned separated from one another and not in operational compression position.

Figure 5:
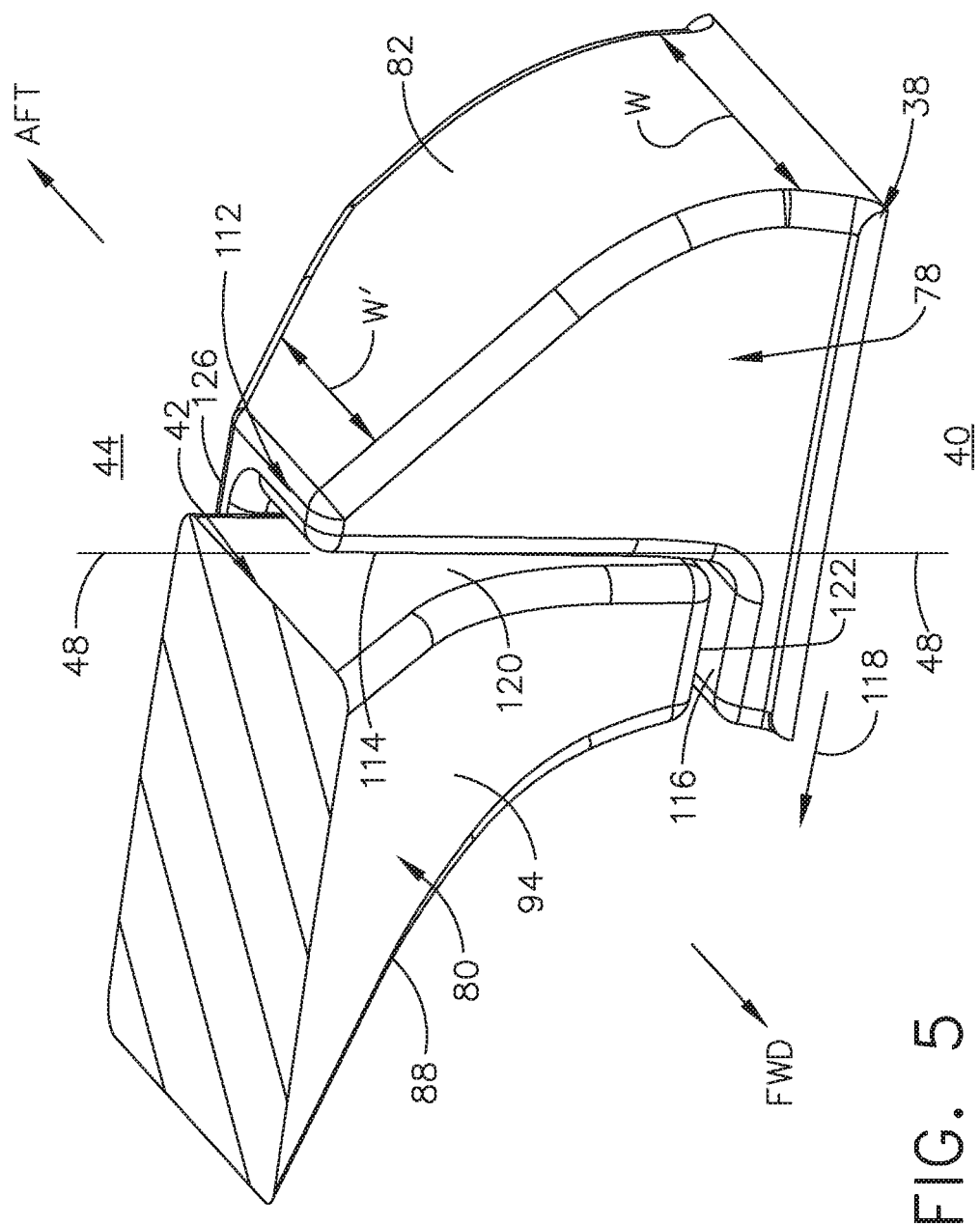
FIG. 5 is a view of FIG. 4 with the first die portion and the second die portion positioned rotated one hundred and eighty degrees.

First die portion 78, as seen in FIG. 5, which extends from first die element 38 on internal side 40 of preform 36 to be formed by compression mold assembly 34 includes first curved surface 82. First curved surface 82 forms an interior surface 84 of first strong back 86 within cell 22 of preform 36 of cascade 14, as seen in FIG. 10A. Second die portion 80, which extends from second die element 42 on external side 44 of preform 36, includes first curved surface 88 which forms interior surface 90 of second strong back 92 within cell 22 of preform 36 of cascade 14, as seen in FIGS. 9 and 10B, to be formed by the compression mold assembly 34.

Figure 4:
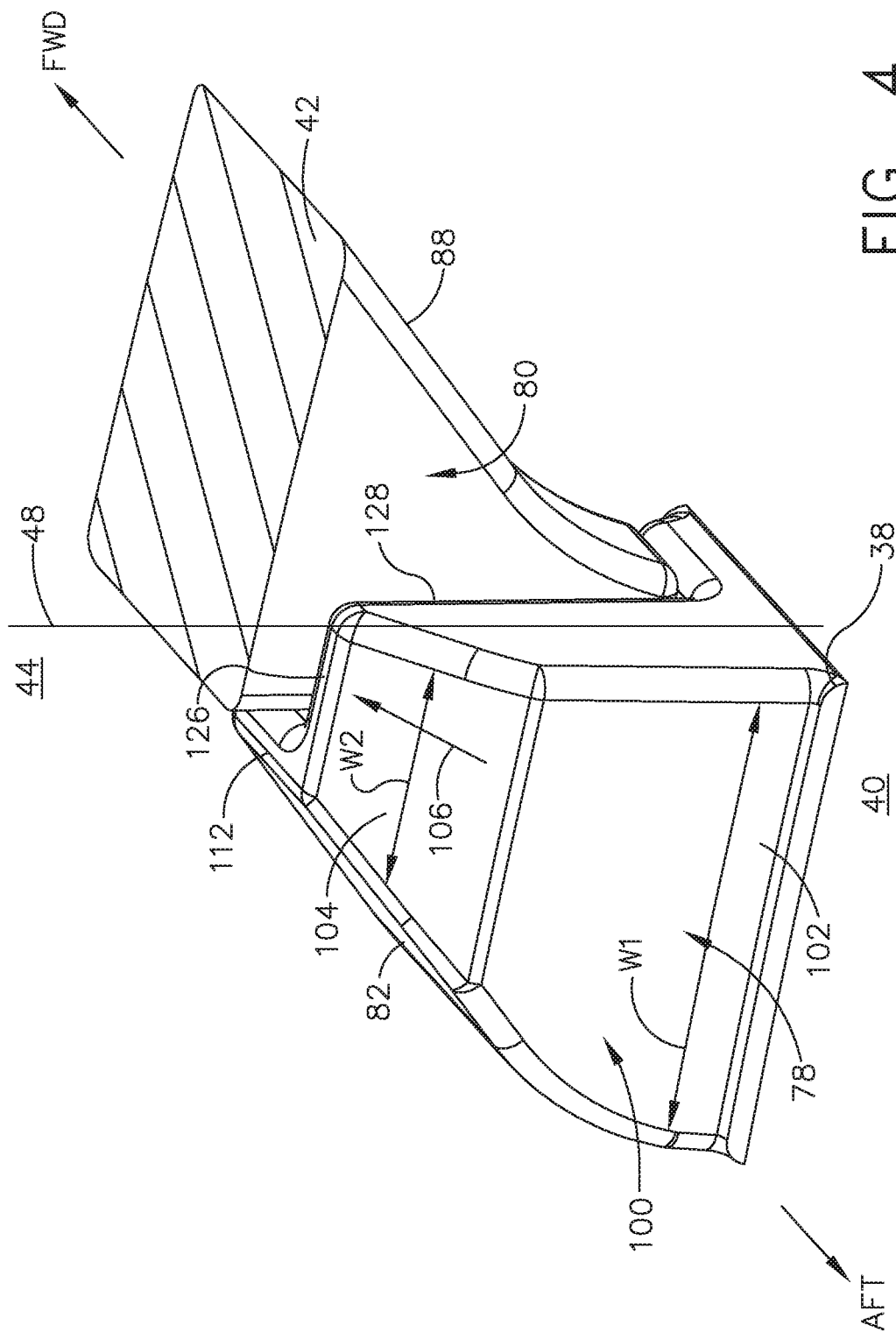
FIG. 4 is a perspective view of a first die portion which extends from a first die element positioned on an internal side of a preform of a cascade to be formed and a second die portion which extends from a second die element positioned on an external side of a preform of a cascade to be formed wherein the first die portion and the second die portion are positioned in compression forming position.
Figure 9:
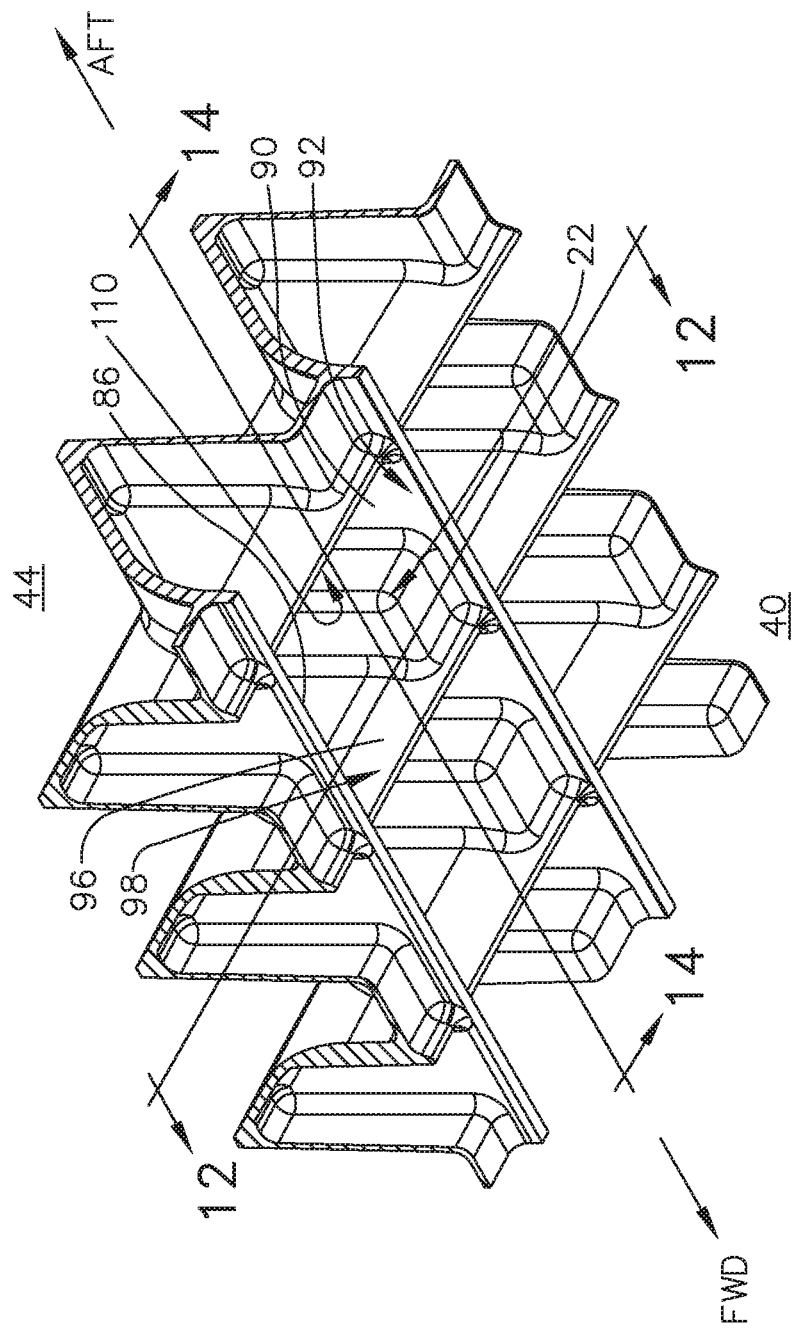
FIG. 9 is a perspective view, of a portion of the formed preform of the cascade encircled and designated as FIG. 9 in FIG. 3, from an internal side of the formed preform cascade.
Figure 10A:
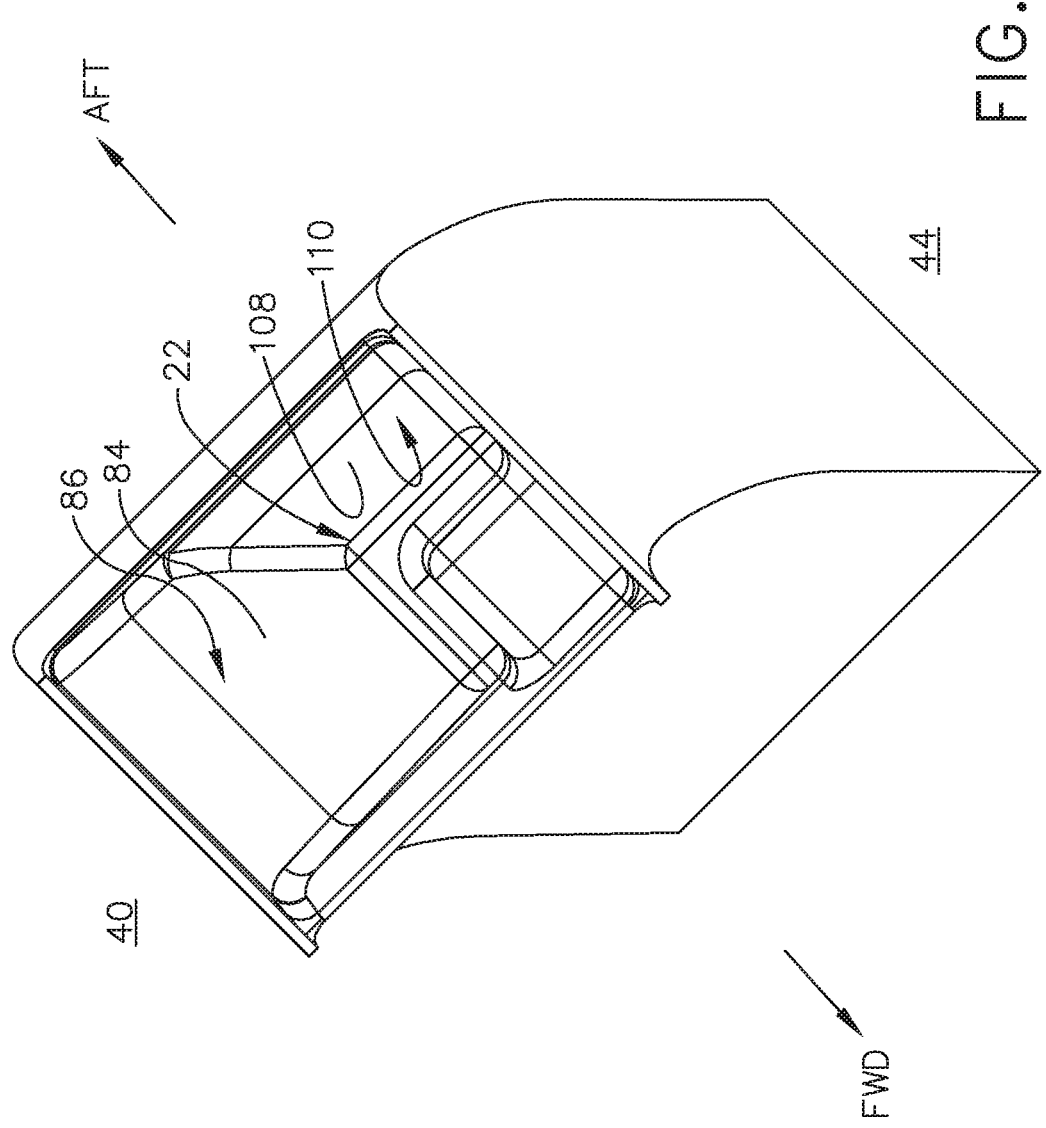
FIG. 10A is a planar view of a cell of the formed preform of the cascade from an internal side of the formed preform of the cascade as seen in FIGS. 3 and 9.
Figure 10B:
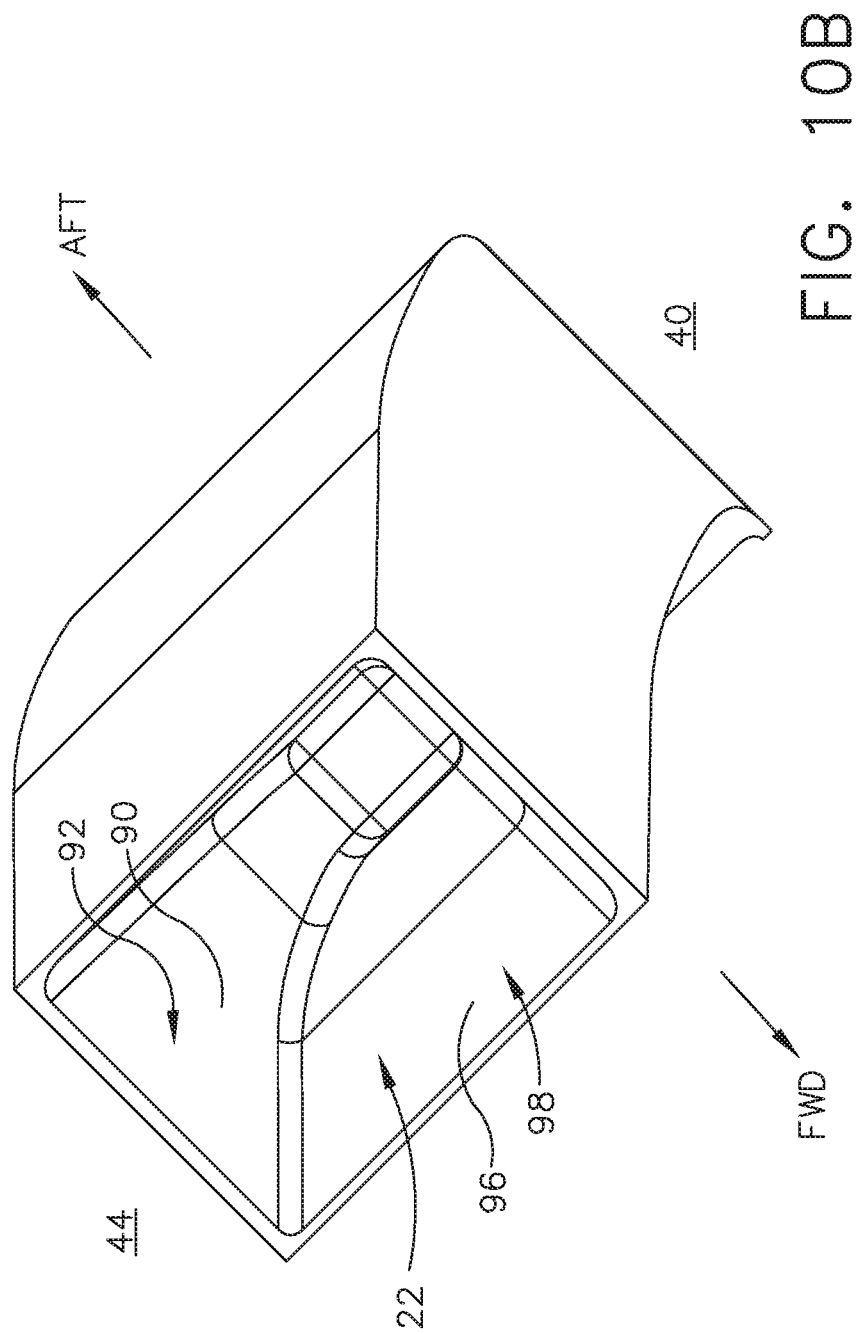
FIG. 10B is a planar view of the cell of FIG. 10A of the formed preform of the cascade from an external side of the formed preform of the cascade.

Second die portion 80 includes second curved surface 94, as seen in FIGS. 5-8, which forms an interior surface 96 of first vane 98 positioned on a forward side of cell 22 of preform 36 of cascade 14, as seen in FIGS. 9 and 10B, to be formed by compression mold assembly 34. First die portion 78 further includes wall assembly 100, as seen in FIGS. 4 and 6, which includes first wall member 102, which extends along line of removal 48 and second wall member 104 which extends in an angular direction 106 relative to first wall member 102. First wall member 102 and second wall member 104 form an interior surface 108, of second vane 110 positioned on aft (AFT) side of cell 22 of preform 36 of cascade 14, as seen in FIG. 10A, to be formed by compression mold assembly 34.

In referring to FIG. 5, width W of the first curved surface 82 of first die portion 78 narrows to width W' as first curved surface 82 extends away from first die element 38. In this example, first curved surface 82 extends to distal end 112 and distal end 112 terminates at third wall member 114 of first die portion 78. Third wall member 114 of first die portion 78 extends away from distal end 112 of first curved surface 82 along line of removal 48. Fourth wall member 116 of first die portion 78 extends from third wall member 114 in direction 118 toward first curved surface 88 of second die portion 80, which forms interior surface 90 of second strong back 92 of cell 22 of preform 36 of cascade 14 to be formed by compression mold assembly 34.

In referring to FIGS. 5, 7 and 8 second die portion 80 includes first wall member 120 and second wall member 122 extending from first wall member 120 such that with first die element 38 and second die element 42 are in operational compression position, as seen in FIGS. 5 and 7, third wall member 114 of first die portion 78 and first wall member 120 of second die portion 80 are positioned spaced apart from one another and fourth wall member 116 of first die portion 78 and second wall member 122 of second die portion 80 are spaced apart from one another. With this configuration, wall 124, as seen in FIGS. 12 and 13 is formed in preform 36 of cascade 14 to extend between formed interior surface 84 of first strong back 86 and formed interior surface 90 of second strong back 92 of preform 36 of cascade 14 to be formed by the compression mold assembly 34.

Figure 11:
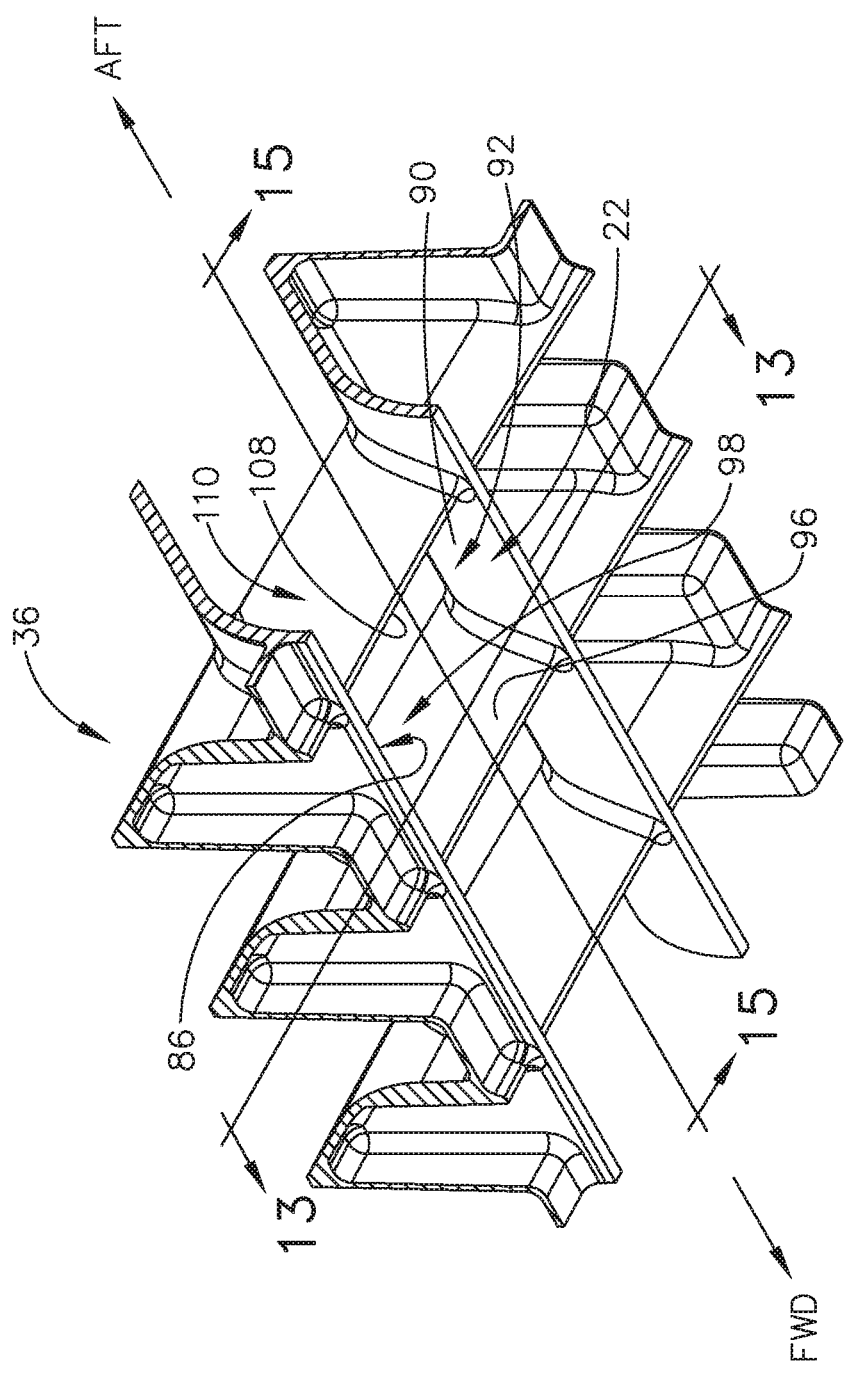
FIG. 11 is the perspective view of the formed preform of the of FIG. 9 with excess polymer removed from a portion of the formed preform of the cascade.
Figure 12:
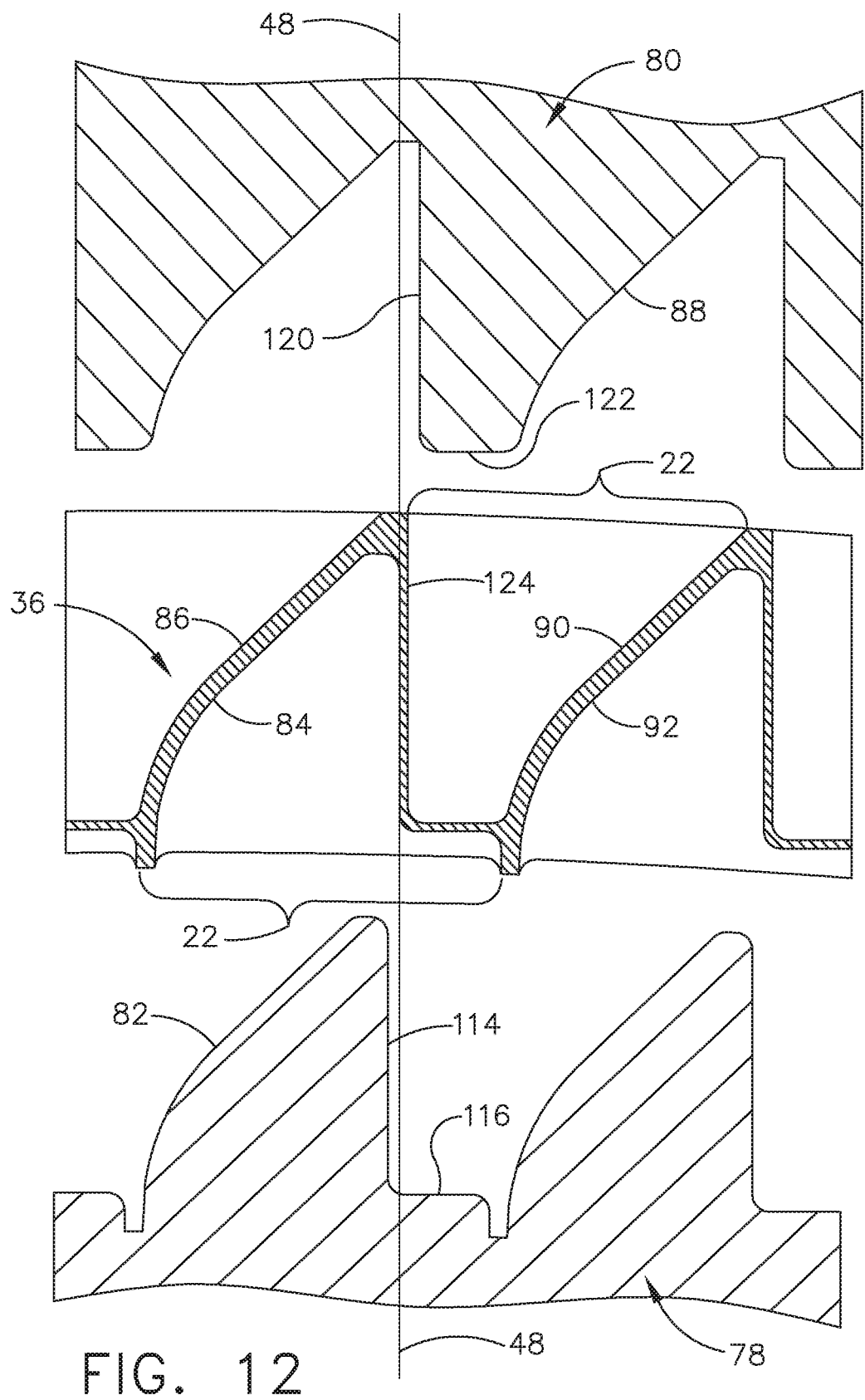
FIG. 12 is a cross section of the formed preform of the cascade taken along line 12-12 of FIG. 9 along with a cross section of the first die portion positioned extracted from the internal side of the formed preform cascade and a cross section of the second die portion positioned extracted from the external side of the formed preform cascade.
Figure 13:
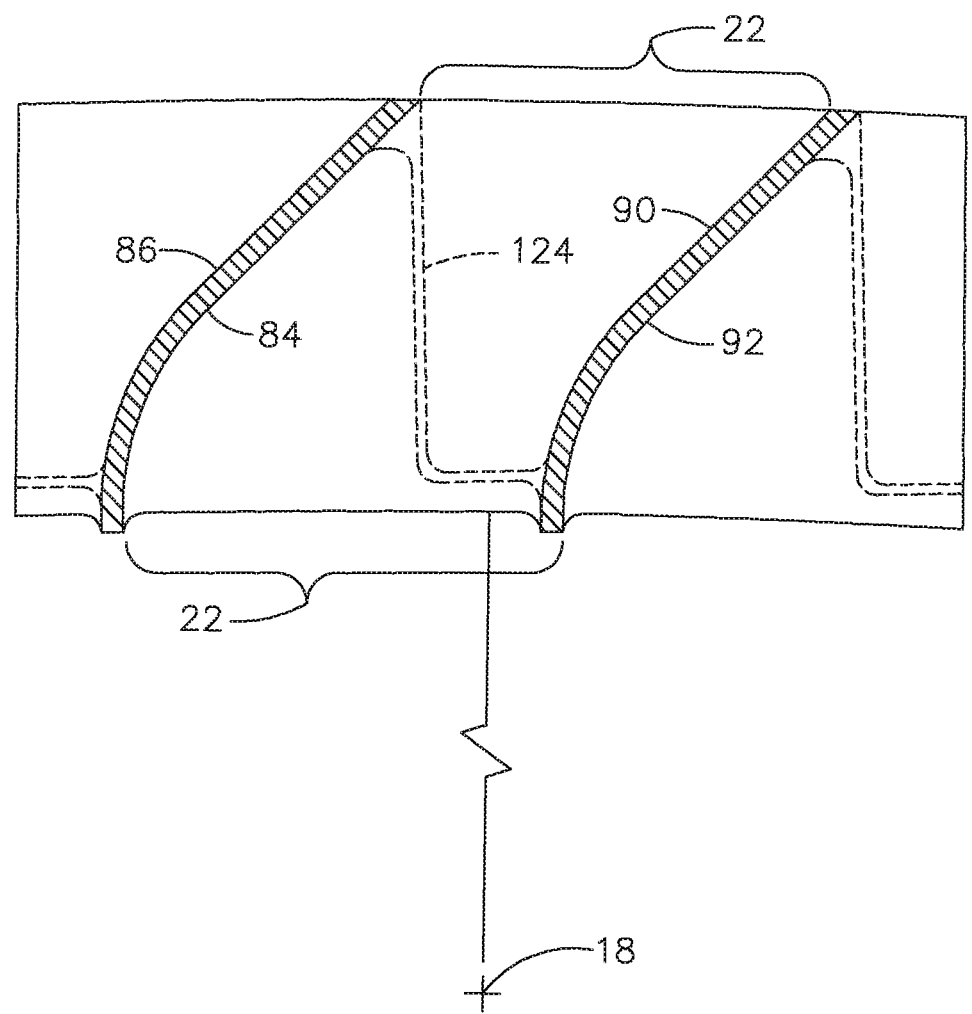
FIG. 13 is a cross section view taken along line 13-13 of FIG. 11 showing in phantom excess polymer material machined away from formed preform of the cascade resulting in operational vanes.

As can be seen in FIG. 12 removing preform 36 from first die portion 78 and second die portion 80 along line of removal 48 results in no interference of formed polymer of preform 36. With removal of preform 36 from compression mold assembly 34 and from first die element 38 and second die element 42, excess polymer from the molding process will need to be removed to open a passageway through cell 22 and attain operational cascade surfaces. In referring to FIG. 11, machine removal of excess polymer from preform 36 has taken place resulting in opening of cell 22 and attaining finished surfaces within cell 22. In referring to FIG. 13, wall 124 formed of polymer used in the compression mold process, as shown in phantom in FIG. 13, has been machine removed resulting in operable interior surfaces 84 and 90 for first and second strong backs 86 and 92 respectively of cell 22 as seen in FIGS. 11 and 13.

In referring to FIGS. 4, 6 and 8, first wall member 102 and second wall member 104 of wall assembly 100 of first die portion 78 narrows in width from width W1 to width W2 as first wall member 102 and second wall member 104 extend away from first die element 38. Second wall member 104 of first die portion 78 extends to distal end 126 fifth wall member 128 of first die portion 78 extends away from distal end 126 of second wall member 104. Fifth wall member 128 extends away from distal end 126 of second wall member 104 of first die portion 78 along the line of removal 48. Fourth wall member 116 of first die portion 78 extends from fifth wall member 128 in direction 130 toward second curved surface 94 of second die portion 80, as seen in FIG. 8, which forms interior surface 96 of first vane 98 positioned on forward (FWD) side of cell 22 of preform 36 of cascade 14 to be formed by compression mold assembly 34.

Figure 14:
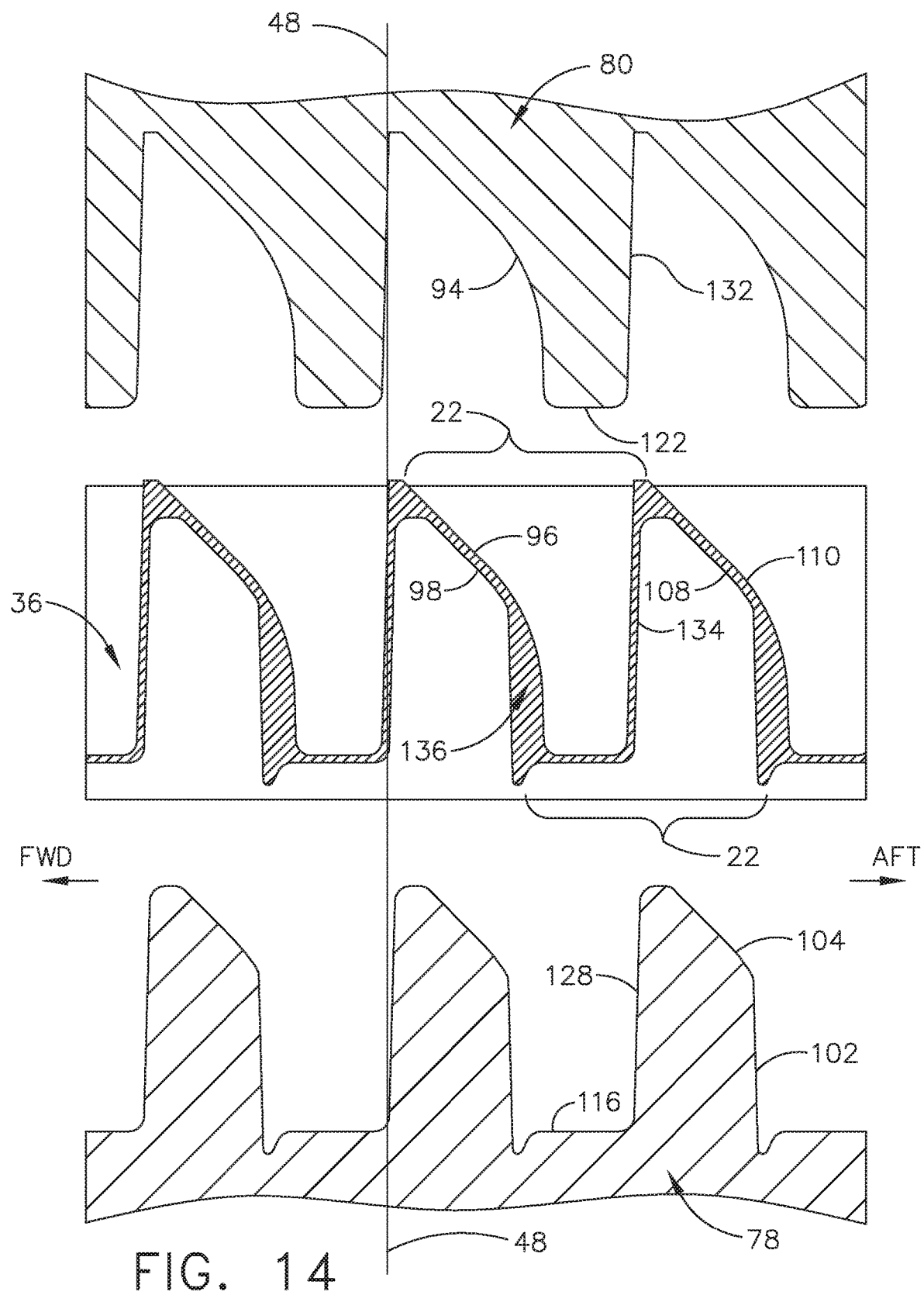
FIG. 14 is a cross section view of the formed preform of the cascade taken along line 14-14 of FIG. 9 along with a cross section of the first die portion positioned extracted from the internal side of the formed preform of the cascade and a cross section of the second die portion positioned extracted from the external side of the formed preform of the cascade.
Figure 15:
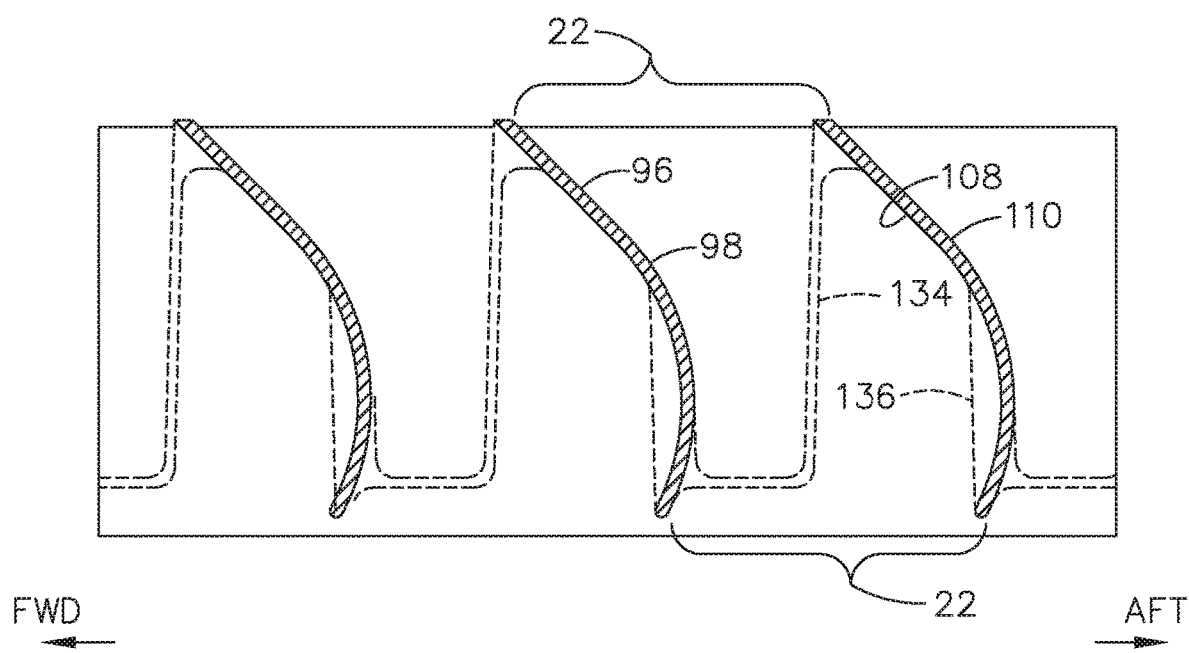
FIG. 15 is a cross section view along line 15-15 of FIG. 11 showing in phantom excess material machined away from formed preform of the cascade of FIG. 11 resulting in operational strong backs.

Second die portion 80, as seen in FIG. 6, includes third wall member 132 with second wall member 122 extending from third wall member 132 such that with first die element 38 and second die element 42 in operational compression position, fifth wall member 128 of first die portion 78 and third wall member 132 of second die portion 80 are positioned spaced apart from one another and fourth wall member 116 of first die portion 78 and second wall member 122 of second die portion 80 are spaced apart from one another for forming wall 134 in preform 36 of cascade 14 to extend between formed interior surface 96 of first vane 98 positioned on forward (FWD) side of cell 22 and formed interior surface 108 of second vane 110 positioned on aft (AFT) side of cell 22 of preform 36 of cascade 14 to be formed by compression molding assembly 34, as seen in FIGS. 14 and 15. With this configuration, wall 134, as seen in FIGS. 14 and 15 is formed in preform 36 of cascade 14 to extend between formed interior surface 96 of first vane 98 positioned on forward (FWD) side of cell 22 and formed interior surface 108 of second vane 110 positioned on aft (AFT) side of cell 22 of preform 36 of cascade 14 to be formed by compression mold assembly 34.

As can be seen in FIG. 14 removing preform 36 from first die portion 78 and second die portion 80 along line of removal 48 results in no interference of formed polymer of preform 36. With removal of preform 36 from compression mold assembly 34 and from first die element 38 and second die element 42, excess polymer from the molding process will need to be removed to open a passageway through cell 22 and attain operational cascade surfaces. In referring to FIG. 11, machine removal of excess polymer from preform 36 has taken place resulting in opening of cell 22 and attaining finished surfaces within cell 22. In referring to FIG. 14, wall 134 is formed from polymer used in compression molding process, as shown in phantom in FIG. 15, has been machine removed as well as excess polymer 136 associated with aft (AFT) side second vane 110 resulting in finished interior surfaces 96 and 108 for first and second vanes 98, 110 respectively.

First die portions 78 can be positioned in arrays in first die element 38 and second die portions 80 can be positioned in arrays in second die element 38 as seen in FIG. 3. Each first die portion 78 is aligned with a corresponding second die portion 80 as seen in FIG. 4. With four other pairs of first and second die portions 78, 80 respectively positioned such that one pair is positioned on each of the four sides of pair of first and second die portions 78, 80 shown in FIG. 4 and positioned all in similar orientation, a cell is formed with two opposing vanes and two opposing strong backs with compression mold assembly 34. The surface(s) of first and second die portions 78, 80 can be adjusted to meet the needed surface orientation of opposing strong backs and opposing vanes within a cell of a preform that is to be formed with compression mold assembly 34. The orientation of the completed surfaces of a preform, as for example as described herein, can be machined to remove excess polymer and attain final operational surfaces for cascade 14. In this example, preform 36 is formed in compression mold assembly 34 and with machining away wall 124 with respect to the strong backs and wall 134 along with excess polymer 136 with respect to the vanes, finished surfaces are attained for cascade 14.

Figure 16:
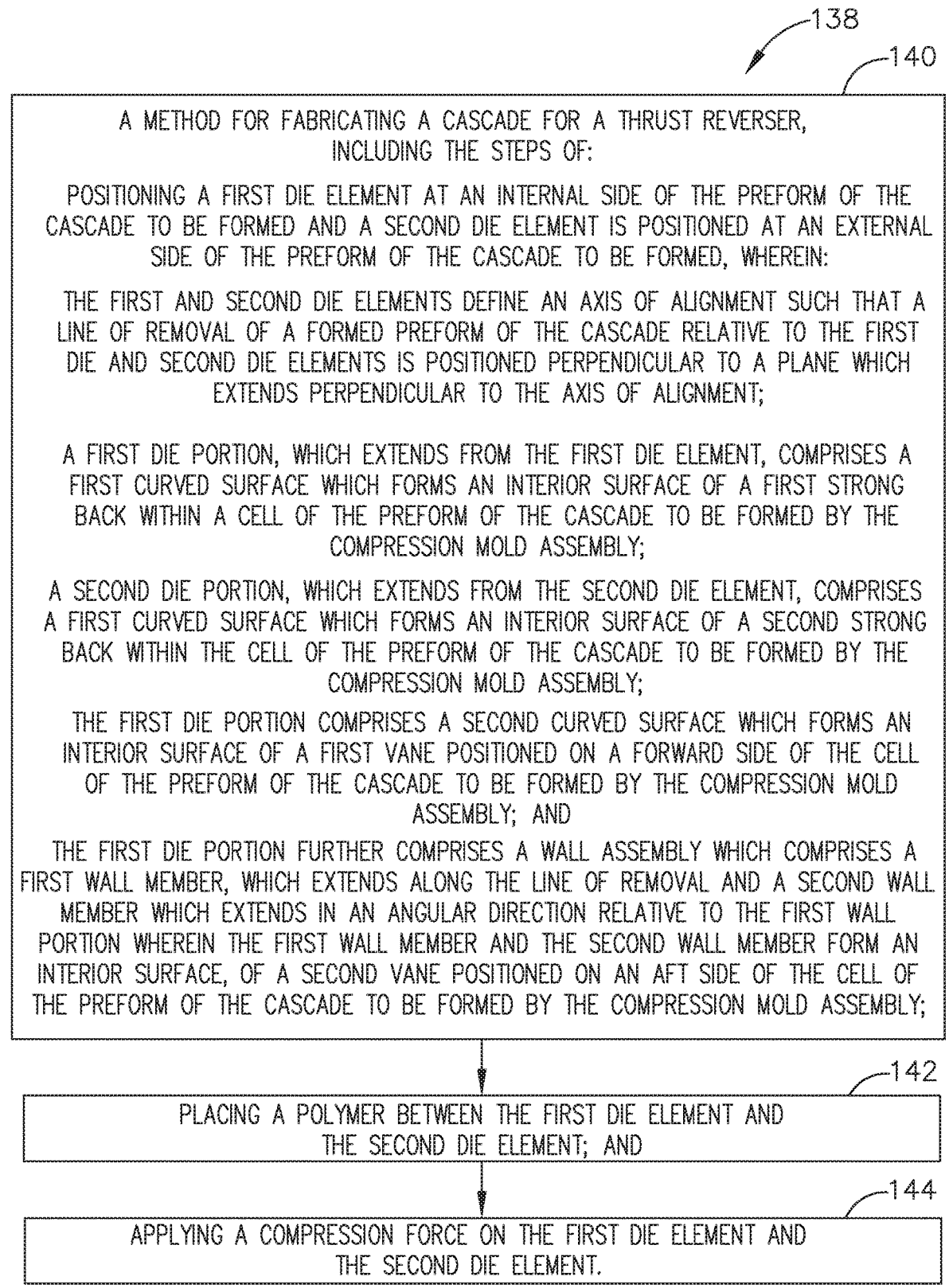
FIG. 16 is a flow chart of a method for fabricating a thrust reverser cascade.

In referring to FIG. 16, method 138 for fabricating cascade 14 for a thrust reverser, includes step 140 of positioning first die element 38 at internal side 40 of preform 36 of cascade 14 to be formed and second die element 42 is positioned at external side 44 of preform 36 of cascade 14 to be formed. First and second die elements 38, 42 define axis of alignment 46 such that line of removal 48 of preform 36 of cascade 14 relative to first die and second die elements 38, 42 is positioned perpendicular to plane 50 which extends perpendicular to axis of alignment 46.

First die portion 78, which extends from first die element 38, includes first curved surface 82 which forms interior surface 84 of first strong back 86 within cell 22 of preform 36 of cascade 14 to be formed by compression mold assembly 34. Second die portion 80, which extends from the second die element 42, includes first curved surface 88 which forms an interior surface 90 of second strong back 92 within cell 22 of preform 36 of cascade 14 to be formed by compression mold assembly 34. Second die portion 80 includes second curved surface 94 which forms interior surface 96 of first vane 98 positioned on forward (FWD) side of cell 22 of preform 36 of cascade 14 to be formed by compression mold assembly 34. In addition, method 138 includes first die portion 78 further including wall assembly 100 which includes first wall member 102, which extends along line of removal 48 and second wall member 104 which extends in angular direction 106 relative to first wall member 102. First wall member 102 and second wall member 104 form interior surface 108 of second vane 110 positioned on aft (AFT) side of cell 22 of preform 36 of cascade 14 to be formed by compression mold assembly 34.

Method 138 further includes step 142 of placing a polymer between first die element 38 and second die element 42. The polymer can include one of a wide variety of thermoset polymers which can provide the needed strength and durability for cascade 14. Method 138 further includes applying a compression force on first die element 38 and second die element 42. The force applied is dependent on the polymer used and the compression force is sustained until preform 36 of cascade 14 has been cured.

Further included in fabricating cascade 14 is separating first die element 38 and second die element 42. The separation removes at least one of the first or second die elements 38, 42 from preform 36 of cascade 14. With complete removal of preform 36 from first and second die elements 38, 42, the fabricator can now machine excess polymer positioned between the interior surface 96 of first vane 98 and interior surface 108 of second vane 110 of preform 36, which includes in this example wall 134. The machining in this example will also include removing excess polymer 136 associated with first vane 98. Method 138 further includes machining excess polymer positioned between interior surface 84 of first strong back 86 and interior surface 90 of second strong back 92 of preform 36, which includes in this example wall 124.

While various embodiments have been described above, this disclosure is not intended to be limited thereto. Variations can be made to the disclosed embodiments that are still within the scope of the appended claims.

What is claimed:

1. A compression mold assembly for forming a preform of a cascade for a thrust reverser assembly, comprising:
 a first die element is positioned at an internal side of the preform of the cascade to be formed and a second die element is positioned at an external side of the preform of the cascade to be formed between the first die element and the second die element, wherein:
  the first and second die elements define an axis of alignment such that a line of removal of a formed preform of the cascade to the first die and the second die elements is positioned perpendicular relative to a plane which extends perpendicular to the axis of alignment;

a first die portion, which extends from the first die element, comprises a first curved surface which forms an interior surface of a first strong back within a cell of the preform of the cascade to be formed by the compression mold assembly, wherein a width of the first curved surface of the first die portion narrows as the first curved surface extends away from the first die element;

a second die portion, which extends from the second die element, comprises a first curved surface which forms an interior surface of a second strong back within the cell of the preform of the cascade to be formed by the compression mold assembly;

the second die portion comprises a second curved surface which forms an interior surface of a first vane positioned on a forward side of the cell of the preform of the cascade to be formed by the compression mold assembly; and the first die portion further comprises a wall assembly which comprises a first wall member, which extends along the line of removal and a second wall member which extends in an angular direction relative to the first wall member wherein:

the first wall member and the second wall member of the wall assembly of the first die portion form an interior surface of a second vane positioned on an aft side of the cell of the preform of the cascade to be formed by the compression mold assembly;

the first curved surface of the first die portion extends to a distal end of the first curved surface and the distal end terminates at a third wall member of the first die portion with the third wall extending away from the distal end along the line of removal;

a fourth wall member of the first die portion extends from the third wall member in a direction toward the first curved surface of the second die portion, which forms an interior surface of the second strong back of the cell of the preform of the cascade to be formed by the compression mold assembly; and the second die portion includes a first wall member and the second die portion includes a second wall member which extends from the first wall member of the second die portion such that with the first die element and the second die element in operational compression position, the third wall member of the first die portion and the first wall member of the second die portion are positioned spaced apart from one another and the fourth wall member of the first die portion and the second wall member of the second die portion are positioned spaced apart from one another for forming a wall in the preform of the cascade to be formed by the compression mold assembly to extend between a formed interior surface of the first strong back and an interior surface of the second strong back of the preform of the cascade to be formed by the compression mold assembly.

2. The compression mold assembly of claim 1, further including a containment assembly positioned surrounding the first die element and the second die element.

3. The compression mold assembly of claim 2, wherein the containment assembly comprises four sidewalls which enclose a four sided first die element and a four sided second die element.

4. The compression mold assembly of claim 3, wherein each of the four sidewalls of the containment assembly defines a shape on an inner surface for forming a corresponding shape to the preform of the cascade to be formed by the compression mold assembly.

5. The compression mold assembly of claim 1, wherein the first wall member and the second wall member of the wall assembly of the first die portion narrows in width as the first wall member of the first die portion and the second wall member of the first die portion extend away from the first die element.

6. The compression mold assembly of claim 5, wherein the second wall member of the wall assembly of the first die portion extends to a distal end and a fifth wall member of the first die portion extends away from the distal end of the second wall member.

7. The compression mold assembly of claim 6, wherein the fifth wall member extends away from the distal end of the second wall member of the first die portion along the line of removal.

8. The compression mold assembly of claim 7, wherein the fourth wall member of the first die portion extends from the fifth wall member in a direction toward the second curved surface of the second die portion, which forms an interior surface of the first vane positioned on the forward side of the cell of the preform of the cascade to be formed by compression mold assembly.

9. The compression mold assembly of claim 8, wherein the second die portion includes a third wall member and the second die portion includes the second wall member which extends from the third wall member of the second die portion such that with the first die element and the second die element are in operational compression position, the fifth wall member of the first die portion and the third wall member of the second die portion are positioned spaced apart from one another and the fourth wall member of the first die portion and the second wall member of the second die portion are spaced apart from one another for forming a wall in the preform of the cascade to be formed by the compression molding assembly to extend between formed interior surface of the first vane positioned on the forward side of the cell and the interior surface of the second vane positioned on the aft side of the cell of the preform of the cascade to be formed by the compression molding assembly.

10. A method for fabricating a preform of a cascade for a thrust reverser assembly, comprising the steps of:

positioning a first die element at an internal side of the preform of the cascade to be formed and a second die element is positioned at an external side of the preform of the cascade to be formed between the first die element and the second die element, wherein:

the first and second die elements define an axis of alignment such that a line of removal of a formed preform of the cascade relative to the first die and the second die elements is positioned perpendicular to a plane which extends perpendicular to the axis of alignment;

a first die portion, which extends from the first die element, comprises a first curved surface which forms an interior surface of a first strong back within a cell of the preform of the cascade to be formed by a compression mold assembly, wherein a width of the first curved surface of the first die portion narrows as the first curved surface extends away from the first die element;

a second die portion, which extends from the second die element, comprises a first curved surface which forms an interior surface of a second strong back within the cell of the preform of the cascade to be formed by the compression mold assembly;

the second die portion comprises a second curved surface which forms an interior surface of a first vane positioned on a forward side of the cell of the preform of the cascade to be formed by the compression mold assembly; and the first die portion further comprises a wall assembly which comprises a first wall member, which extends along the line of removal and a second wall member which extends in an angular direction relative to the first wall member wherein:

the first wall member and the second wall member of the wall assembly of the first die portion form an interior surface of a second vane positioned on an aft side of the cell of the preform of the cascade to be formed by the compression mold assembly;

the first curved surface of the first die portion extends to a distal end of the first curved surface and the distal end terminates at a third wall member of the first die portion with the third wall member extending away from the distal end along the line of removal;

a fourth wall member of the first die portion extends from the third wall member in a direction toward the first curved surface of the second die portion, which forms an interior surface of the second strong back of the cell of the preform of the cascade to be formed by the compression mold assembly; and the second die portion includes a first wall member and the second die portion includes a second wall member which extends from the first wall member of the second die portion such that with the first die element and the second die element in operational compression position, the third wall member of the first die portion and the first wall member of the second die portion are positioned spaced apart from one another and the fourth wall member of the first die portion and the second wall member of the second die portion are positioned spaced apart from one another for forming a wall in the preform of the cascade to be formed by the compression mold assembly to extend between a formed interior surface of the first strong back and an interior surface of the second strong back of the preform of the cascade to be formed by the compression mold assembly;

placing a polymer between the first die element and the second die element; and applying a compression force on the first die element and the second die element such that the polymer is compressed between the first die element and the second die element forming the preform of the cascade for the thrust reverser assembly.

11. The method of claim 10, further including curing the polymer forming the preform of the cascade.

12. The method of claim 11, further including separating the first die element and the second die element.

13. The method of claim 12, further including removing the preform of the cascade, from one of the first die element or the second die element.

14. The method of claim 13, further including machining excess polymer positioned between the interior surface of the first vane and the interior surface of the second vane of the preform of the cascade.

15. The method of claim 13, further including machining excess polymer positioned between the interior surface of the first strong back and the interior surface of the second strong back of the preform of the cascade.

16. The method of claim 10, wherein the first wall member and the second wall member of the wall assembly of the first die portion narrows in width as the first wall member of the first die portion and the second wall member of the first die portion extend away from the first die element.

17. The method of claim 16, wherein the second wall member of the wall assembly of the first die portion extends to a distal end and a fifth wall member of the first die portion extends away from the distal end of the second wall member.

18. The method of claim 17, wherein the fifth wall member extends away from the distal end of the second wall member of the first die portion along the line of removal.

19. The method of claim 18, wherein the fourth wall member of the first die portion extends from the fifth wall member in a direction toward the second curved surface of the second die portion, which forms an interior surface of the first vane positioned on the forward side of the cell of the preform of the cascade to be formed by compression mold assembly.

20. The method of claim 19, wherein the second die portion includes a third wall member and the second die portion includes the second wall member which extends from the third wall member of the second die portion such that with the first die element and the second die element are in operational compression position, the fifth wall member of the first die portion and the third wall member of the second die portion are positioned spaced apart from one another and the fourth wall member of the first die portion and the second wall member of the second die portion are spaced apart from one another for forming a wall in the preform of the cascade to be formed by the compression molding assembly to extend between formed interior surface of the first vane positioned on the forward side of the cell and the interior surface of the second vane positioned on the aft side of the cell of the preform of the cascade to be formed by the compression molding assembly.

\* \* \* \* \*